United States Patent
Kobayashi

(10) Patent No.: US 6,910,970 B2
(45) Date of Patent: Jun. 28, 2005

(54) CONSTANT VELOCITY UNIVERSAL JOINT

(75) Inventor: Masazumi Kobayashi, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/108,988

(22) Filed: Mar. 29, 2002

(65) Prior Publication Data

US 2002/0169025 A1 Nov. 14, 2002

(30) Foreign Application Priority Data

Apr. 9, 2001 (JP) .................................. 2001-110259

(51) Int. Cl.$^7$ ............................................. F16D 3/224
(52) U.S. Cl. ..................... 464/145; 464/906; 384/497
(58) Field of Search .......................... 464/141–146, 464/906; 384/495–497, 523

(56) References Cited

U.S. PATENT DOCUMENTS

| | | | | |
|---|---|---|---|---|
| 2,838,919 A | * | 6/1958 | Cull | 464/145 |
| 3,076,323 A | * | 2/1963 | Aucktor | 464/145 |
| 4,019,347 A | * | 4/1977 | Krude | 464/145 |
| 4,305,263 A | * | 12/1981 | Kako et al. | 464/145 |
| 4,610,643 A | * | 9/1986 | Krude | 464/143 |
| 4,968,287 A | * | 11/1990 | Jacob | 464/145 |
| 5,230,659 A | * | 7/1993 | Bird et al. | 464/143 |
| 5,242,329 A | | 9/1993 | Jacob | 464/145 |
| 5,692,960 A | * | 12/1997 | Sugiyama et al. | 464/145 |
| 6,071,210 A | * | 6/2000 | Kato et al. | 476/42 |
| 6,135,891 A | | 10/2000 | Sone et al. | 464/145 |
| 6,497,622 B1 | * | 12/2002 | Bilz et al. | 464/144 |

FOREIGN PATENT DOCUMENTS

| | | |
|---|---|---|
| EP | 0 950 824 A2 | 10/1999 |
| GB | 637718 | 5/1950 |

* cited by examiner

Primary Examiner—David Bagnell
Assistant Examiner—K. Thompson
(74) Attorney, Agent, or Firm—Arent Fox PLLC

(57) ABSTRACT

It is made easy to design so that the sliding resistance, when subjected to an impact in the axial direction, is kept within a prescribed value. A constant velocity universal joint is provided, which has track grooves extending in the axial direction on the outer circumference surface of the inner ring, and formed in an intersecting arrangement, and which also embeds balls in these track grooves. In this constant velocity universal joint, the cross-sectional shape of the track groove of the inner ring is constituted by a Gothic arch portion which is a Gothic arch shape up to a location that exceeds a contact point where the groove angular contacts with the ball, and a straight-line portion which is formed continuously with the Gothic arch portion, between the location exceeding the contact point and a shoulder portion of the track groove, and which extends in the direction of the tangent line at the location that exceeds the contact point.

6 Claims, 7 Drawing Sheets

CONSTANT VELOCITY UNIVERSAL JOINT

BACKGROUND OF THE INVENTION

1. Field of the Invention

The present invention relates to a Lobro-type constant velocity universal joint that is suited for a propeller shaft used in four-wheel-drive cars and front-engine rear-wheel-drive cars.

2. Description of the Related Art

In four-wheel-drive cars and front-engine rear-wheel-drive cars, a so-called Lobro-type (or cross-groove type) constant velocity universal joint is used, to realize a propeller shaft construction that can cope with an angle change due to a change in the relative location between the transmission and the differential gear.

This Lobro-type constant velocity universal joint is shown in FIG. 4 as an example. This constant velocity universal joint has an inner ring 1, an outer ring 2, a ball 3, and a cage 4 as main components. The inner ring 1 has a stub shaft (not shown) of a propeller shaft intermeshed by serration onto its central hole 5, and has a plurality of track grooves 6 formed on its outer circumference surface, in the axial direction. The outer ring 2 is located on the outer circumference of the inner ring 1, and has the same number of track grooves 7 as the track grooves 6 of the inner ring 1, on its inner circumference surface, and in the axial direction. The track grooves 6 of the inner ring 1, and the track grooves 7 of the outer ring 2 are angled in the opposite direction with regard to the axis line, and the ball 3 is embedded in an intersecting portion between both of the track grooves 6 and 7. The cage 4 is arranged between the inner ring 1 and the outer ring 2, and the ball 3 is accommodated within a pocket 8 of this cage 4.

FIG. 5 is a cross-sectional view taken along the A—A line in FIG. 4, and the cage 4 and the outer ring 2 are not shown and only the inner ring 1 and the ball 3 are shown partially in an enlarged form. The cross-sectional shape of the track groove 6 is a Gothic arch form, formed by broaching processing with a radius of curvature R that is bigger than the radius "r" of the ball 3, as shown in the drawing. By making the cross section of the track groove a Gothic arch form, the contact between the track groove 6 and the ball 3 is made an angular contact, with a track contact angle α. It is the same with the track grooves 7 of the outer ring 2, which are not shown.

When an impact is generated in an automobile with this Lobro-type constant velocity universal joint, the components around the inner ring, such as the inner ring 1, the ball 3, and the cage 4, try to slide and move in the axial direction relative to the outer ring 2, through the intervention of the stub shaft of the propeller shaft that was subjected to the impact. A displacement between the transmission and the differential gear in the axial direction is absorbed by this slide movement, and the impact force inputted onto the car body through the intervention of the differential gear is reduced, substantially reducing the impact generated in the car body, and improving safety.

In this constant velocity universal joint, the cage 4 and the inner ring 1 slide in the axial direction, relative to the outer ring 2, when subjected to an impact in the axial direction caused by a car collision. Since the sliding resistance generating at this moment associates with vibration and noise problems in an actual car, or with durability problems caused by a rise in internal temperature in an actual car, the sliding resistance is strictly controlled as an important characteristic of the constant velocity universal joint. With the Lobro-type constant velocity universal joint used in a propeller shaft, the inner and outer rings 1 and 2, and the ball 3 are designed with the interference of the PCD clearance in mind, in order to eliminate backlashes inside the joint in the rotating direction, and the sliding resistance is determined by this interference of the PCD clearance.

This sliding resistance is strictly regulated for the whole area of the slidable area in the axial direction of the joint, or the whole area of the sliding area necessary in an actual car. The dispersion of the sliding resistance sometimes becomes high, because the amount of the aforementioned interference of the PCD clearance changes in accordance with factors such as heat treatment deformation of the track grooves 6 and 7 of the inner and outer rings 1 and 2, mutual pitch difference between the track grooves 6 and 7, and mutual difference between the intersecting angles. In this case, a matching operation will be needed in order to put the sliding resistance within a prescribed value.

The possibility of an occurrence of a deformation "a" or a burr "b", caused by a dent, is high, particularly at the track groove 6 of the inner ring 1, as shown in FIGS. 6a and 6b. This is because, there is a possibility of the components colliding with each other during the transportation of the components, or during the input of components into processing machines, or during the ejection (falling) of the components, and also because the shoulder portion X connecting the aforementioned track groove 6 and the outer diameter portion of the inner ring 1, has an acute angle. Therefore, there is fear of a deformation "a" caused by dents generating at this shoulder portion X, and also fear of a burr "b" generating at the aforementioned shoulder portion X, when processing the track groove 6 by broaching. When there is a deformation "a" or a burr "b" caused by the dent, and when the ball 3 rotates and slides along the track groove 6, the ball 3 runs up onto this deformation or burr, and suddenly increasing the sliding resistance. This greatly affects the sliding resistance.

SUMMARY OF THE INVENTION

An object of the present invention is to make it easy to design, so that the sliding resistance, when subjected to an impact in the axial direction, is kept within a prescribed value.

The present invention relates to a constant velocity universal joint that has track grooves formed on both an outer circumference of the inner ring and an inner circumference surface of the outer ring, and extending in an axial direction. This constant velocity universal joint also accommodates balls embedded between both of the track grooves, in a pocket of a cage interposed between the outer circumference of the inner ring and the inner circumference surface of the outer ring. This constant velocity universal joint is characterized in that a cross-sectional shape of at least the track groove of the inner ring, among the track grooves of the inner and outer rings, is constituted by a Gothic arch portion that angular contacts with the ball, and an undercut portion formed between a location exceeding a contact point of the Gothic arch portion and the ball and a shoulder portion of the track groove, and retreating from the surface of the radius of curvature of the Gothic arch portion. This invention can be applied to a Lobro-type constant velocity universal joint (LJ), a Rzepper-type constant velocity universal joint (BJ), and a double offset type constant velocity universal joint (DOJ).

For the undercut portion, it is possible to have a straight-line portion formed continuously with the Gothic arch portion at the location exceeding the contact point, or a curve portion formed continuously with the Gothic arch portion at the location exceeding the contact point, and having a radius of curvature bigger than the radius of curvature at the contact point. With regard to the track groove, it is preferred that at least the portion between the location exceeding the contact point and the shoulder portion of the track groove is formed by forging surface, or chamfering is formed at the shoulder portion of the track groove.

In this invention, it is possible to make the clearance between the shoulder portion of the track groove and the ball bigger than in conventional joints, by having the undercut portion, which is composed of the aforementioned straight-line portion or curve portion, formed from the location exceeding the contact point of the Gothic arch portion and the ball, to the shoulder portion of the track groove. By constituting in this way, when there is a deformation or a burr caused by a dent on the shoulder portion of the track groove, an interference of these deformation or burr to the ball can be restrained when the ball rolls in the track groove. It is also possible to prevent the ball from running up onto the shoulder portion, because the size of the contact ellipse between the ball and the track groove under a torque load is made small. As a result, it becomes easy to design so that the sliding resistance, when subjected to an impact in the axial direction, is kept within a prescribed value. In the case of a fixed-type of the Rzeppa-type constant velocity universal joint (BJ), it is possible to pursue a stabilization of the bending torque, and pursue an improvement in reliability, and also possible to provide a high performance constant velocity universal joint.

The reason why it was described "at least the track groove of the inner ring", is because the deformation or burr caused by a dent is more prone to be generated in the track grooves of the inner ring than in the track grooves of the outer ring. Therefore, the shape of the track groove of the outer ring can also be made a composite Gothic arch shape, composed of a Gothic arch portion, and a straight-line portion or a curve portion.

The "location exceeding the contact point" means the border portion between the Gothic arch portion, and the straight-line portion or the curve portion, and it is located between the contact point of the Gothic arch portion and the ball and the shoulder portion of the track groove. This location is determined by the size of the deformation or burr caused by the dent, and the size of the contact ellipse between the ball and the track groove under a torque load. The "retreating from a surface of the radius of curvature of the Gothic arch portion" means that the surface of the track groove at the undercut portion is formed so as to have a clearance with the ball larger than in the case of a virtual groove surface, when this virtual groove surface is a groove surface formed virtually by the radius of curvature of the Gothic arch portion. The "continuously" means both of the groove surfaces are connected smoothly at the border of the Gothic arch portion and the straight-line portion or the curve portion.

DETAILED DESCRIPTION OF THE PREFERRED EMBODIMENTS

Figure 1:
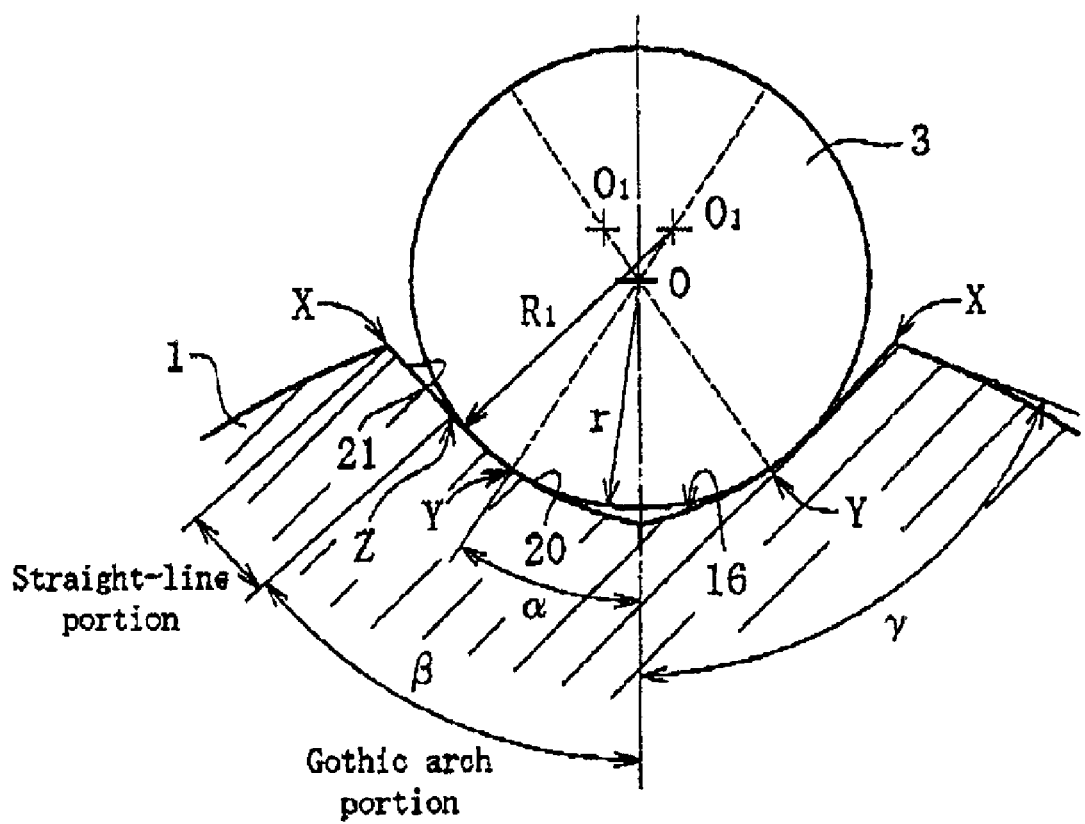
FIG. 1 is an enlarged cross-sectional view of the principal part, showing a track groove of an inner ring and a ball in accordance with an embodiment of the present invention.
Figure 4:
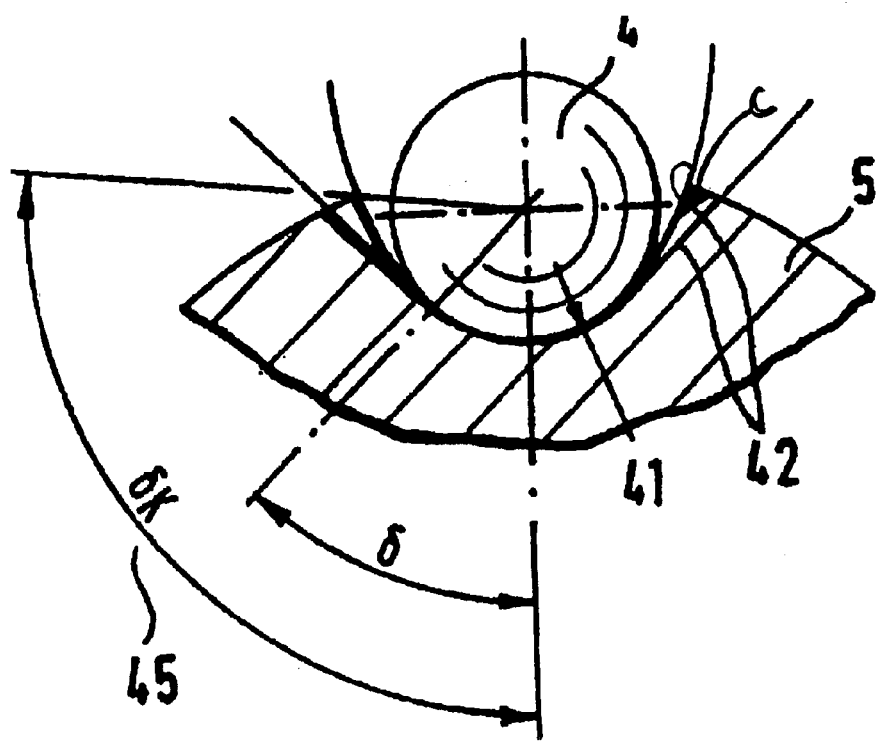
FIG. 4 is a longitudinal section view showing an example of a Lobro-type constant velocity universal joint.
Figure 5:
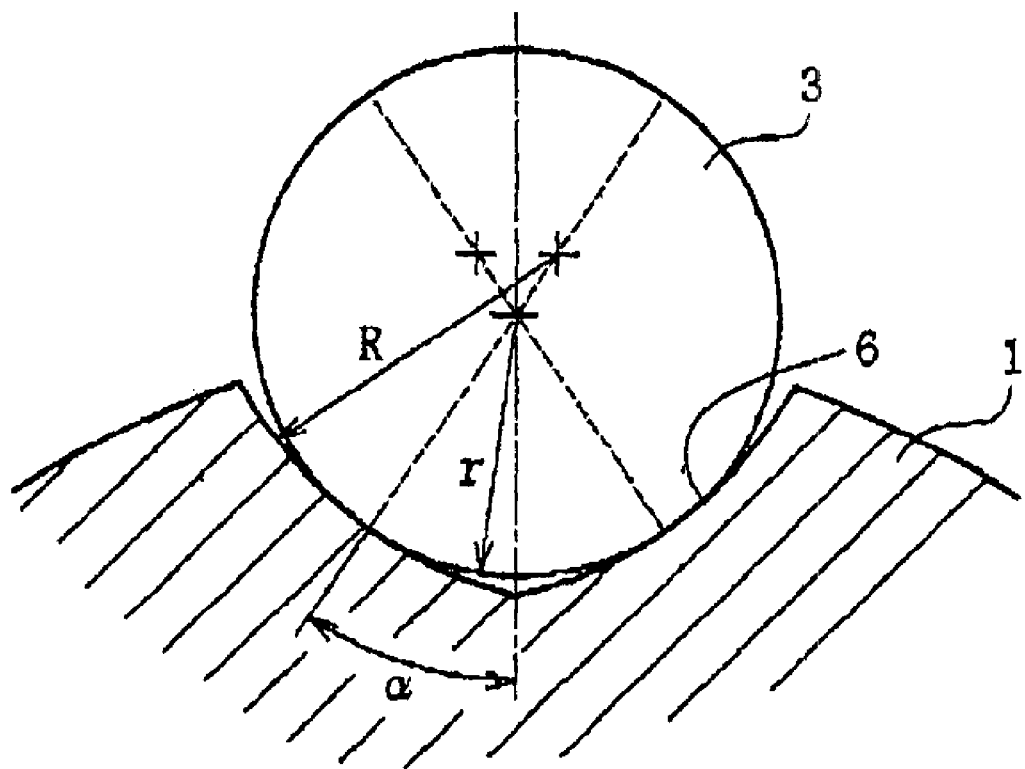
FIG. 5 is an enlarged cross-sectional view of the principal part, showing a track groove of an inner ring and a ball in a conventional example of a constant velocity universal joint.

An embodiment of the present invention is shown in FIG. 1. In this figure, only a track groove 16 of an inner ring 1 and a ball 3 are shown in an enlarged state, because the only point that this embodiment is different from a conventional example (refer to FIG. 5), is in the shape of the track groove 16 of the inner ring 1. In this embodiment, reference to drawings and repeated descriptions are omitted for portions other than those shown, because they are the same as in conventional ones (refer to FIG. 4).

The cross-sectional shape of the track groove 16 of the inner ring 1 is constituted by a Gothic arch shape up to a location Z exceeding the contact point Y where the ball 3 angular-contacts therewith, and a straight line shape continuously extending in a direction of the tangent line at the location Z exceeding the contact point Y, between the location Z exceeding the contact point Y and the shoulder portion X of the track groove 16.

This Gothic arch portion 20 has a track groove center $O_1$ that is located on an extended line connecting the contact point Y, where the ball 3 with a radius of "r" angular-contacts with the track groove 16, to the center of the ball O, and extending to the opposite side from the contact point Y. This Gothic arch portion 20 also has a radius of curvature $R_1$ bigger than the radius of the ball "r". The ratio of the radius of the ball "r" and the radius of curvature $R_1$ (contact rate) is usually 1.01 to 1.12, and preferably 1.02 to 1.08.

By making the cross-sectional shape of the track groove a Gothic arch shape in such a way, the contact between the track groove 16 and the ball 3 is made an angular contact, with a track contact angle $\alpha$. Therefore, the formed angle $\beta$ of the Gothic arch portion 20 is defined to be bigger than the track contact angle $\alpha$, and defined to be up to the location Z exceeding the contact point Y. A straight-line portion 21 is formed from this location Z exceeding the contact point Y to the shoulder portion X of the track groove 16.

Figure 6A:
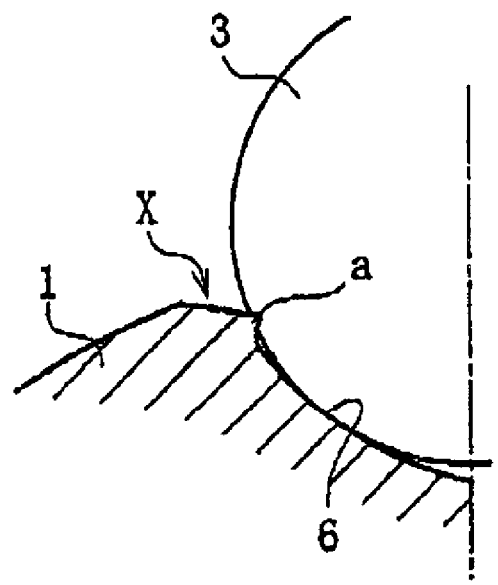
FIG. 6a is an enlarged cross-sectional view of the principal part, showing a state with a deformation due to a dent generated at a shoulder portion of the track groove on the inner ring.
Figure 6B:
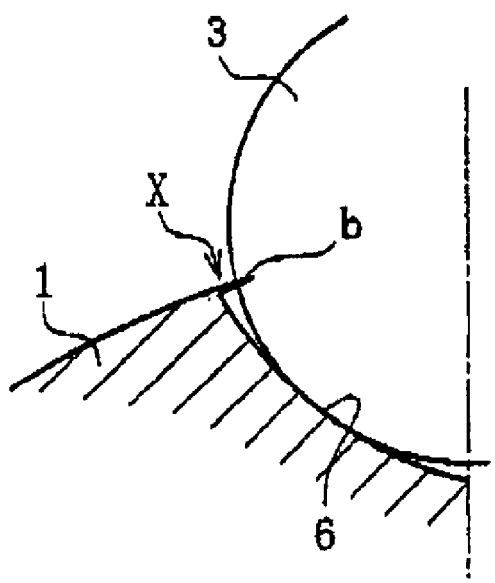
FIG. 6b is an enlarged cross-sectional view of the principal part, showing a state with a burr generated at a shoulder portion of the track groove on the inner ring.

This straight-line portion 21 is an undercut portion retreating from the surface of the radius of curvature of the Gothic arch portion 20, and is formed a straight line extending in the direction of the tangent line at the location Z exceeding the contact point Y. The border portion with the Gothic arch portion 20, which is the location Z exceeding the contact point Y, has continuity maintained between the Gothic arch portion 20 and the straight-line portion 21, and connects them smoothly. Therefore, the formed angle β of the Gothic arch portion 20 is configured to be smaller than the angle γ up to the shoulder portion X of the track groove 16. This formed angle β of the Gothic arch portion 20 is determined by the size of a deformation "a" or a burr "b" caused by a dent (refer to FIG. 6), and the size of a contact ellipse between the ball 3 and the track groove 16 under a torque load.

Figure 2:
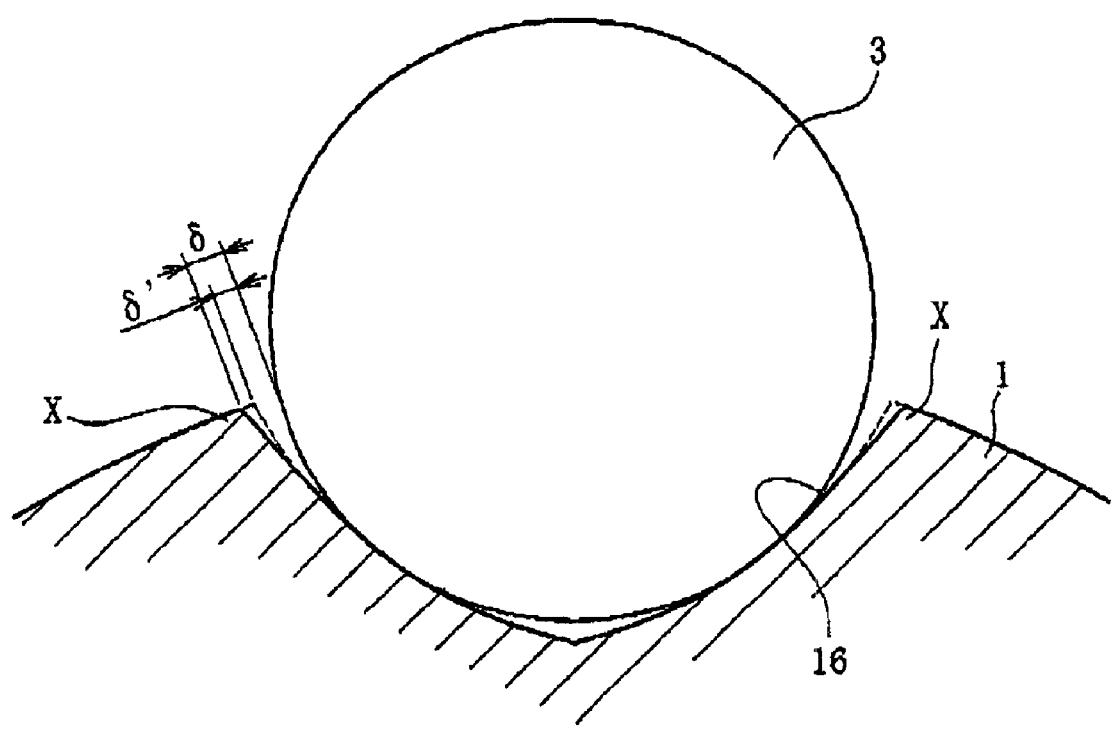
FIG. 2 is an enlarged cross-sectional view of the principal part in the embodiment of FIG. 1, for describing a track groove of a composite Gothic arch form in comparison to a conventional form.

By constituting the cross-sectional shape of the track groove 16 of the inner ring 1 with the Gothic arch portion 20 up to the location Z exceeding the contact point Y where the ball 3 angular-contacts with the groove, and the straight-line portion 21 from the location Z exceeding the contact point Y to the shoulder portion X of the track groove 16, as shown in FIG. 1, a clearance δ (50 to 100 μm for example) between the shoulder portion X of the track groove 16 and the ball 3 can be made bigger than the clearance δ (20 to 40 μm for example) in the case of a conventional joint, as shown in FIG. 2. As a result, interference by a deformation or a burr to the ball 3 can be restrained when the ball 3 rolls on the track groove 16, even when there is a deformation or a burr caused by a dent on the shoulder portion X of the track groove 16. The size of the contact ellipse between the ball 3 and the track groove 16 under a torque load is also made small in this constitution, and this can prevent the ball 3 from running up onto the shoulder portion X.

Figure 3:
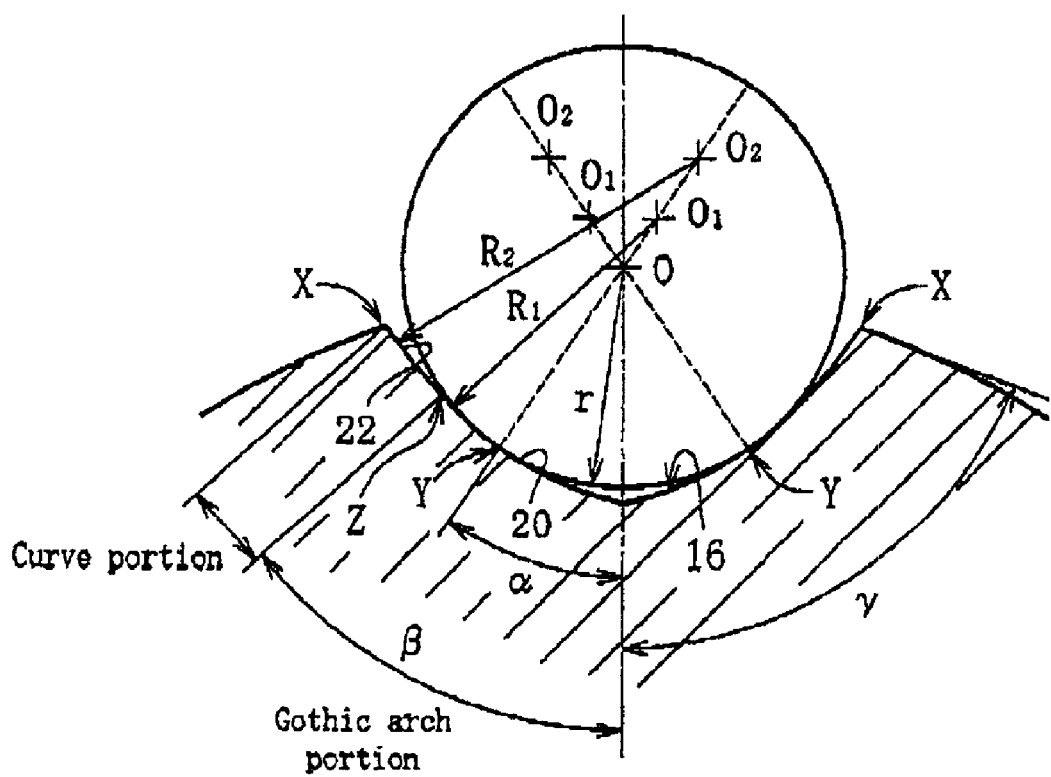
FIG. 3 is an enlarged cross-sectional view of the principal part, showing a track groove of an inner ring and a ball in accordance with another embodiment of the invention.

In the embodiment of FIG. 1, the track groove 16 was made a composite Gothic arch shape, with the Gothic arch portion 20 and the straight-line portion 21. However, it is possible to have other embodiments, such as having a curve portion 22 formed with a radius of curvature $R_2$ that is bigger than the radius of curvature $R_1$ of the Gothic arch portion 20 instead of the straight-line portion 21, as shown in FIG. 3.

This curve portion 22 is an undercut portion retreating from the surface of the radius of curvature of the Gothic arch portion 20, and is formed by a center $O_2$ of the curve portion, which is located on an extended line connecting the contact point Y, the center of the ball O, and the center $O_1$ of the track groove, and extending to the opposite side from the contact point Y.

With regard to this curve portion 22, interference of the deformation or burr, caused by a dent, to the ball 3 can be restrained even more, because the clearance with the ball 3 becomes bigger as the radius of curvature $R_2$ becomes bigger. It is also possible to restrain the ball 3 from running up onto the shoulder portion X, because the size of the contact ellipse between the ball 3 and the track groove 16 under a torque load can be made small. On the other hand, the radius of curvature $R_2$ of this curve portion 22 should be configured to an optimum value according to the using condition. This is because the pressure on the contacting surface becomes bigger and affects durability while the size of the contact ellipse under a torque load is made small.

The border portion between the Gothic arch portion 20 and the curve portion 22 has continuity maintained between the Gothic arch portion 20 and the curve portion 22, and connects them smoothly, as in the case of the aforementioned straight-line portion 21. The formed angle β of the Gothic arch portion 20 is configured to be bigger than the track contact angle α, and smaller than the angle γ up to the shoulder portion X of the track groove 16. This formed angle β of the Gothic arch portion 20 is determined by the size of the deformation or burr caused by an assumed dent, and the size of the contact ellipse between the ball 3 and the track groove 16, under a torque load.

Figure 1A:
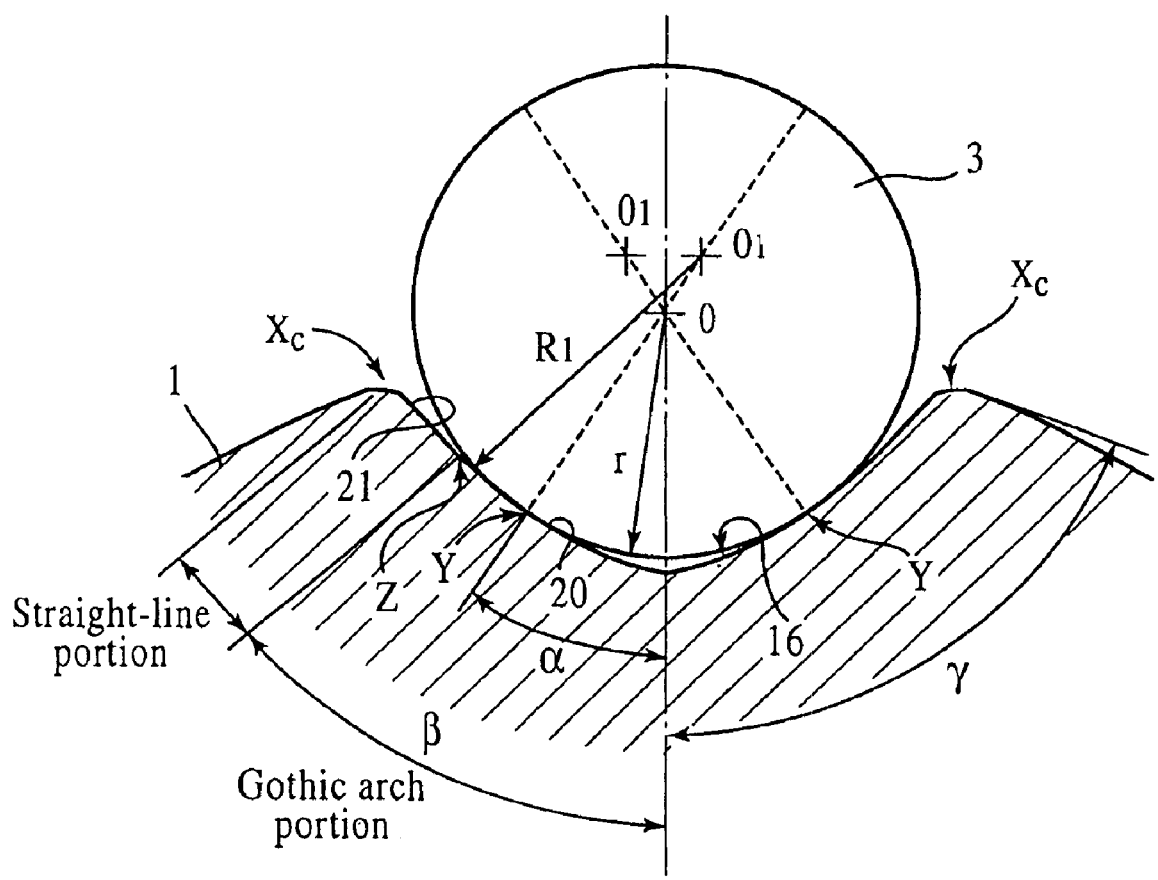
FIG. 1A is an enlarged cross-sectional view of the principal part, showing a chamfered shoulder portion of the track groove, according to an embodiment of the present invention.

The track groove 16 can be formed by a broaching process. When using a broaching cutter having a shape complying with the composite Gothic arch shape composed of the Gothic arch portion 20, and the straight-line portion 21 or the curve portion 22, it is possible to change easily without raising costs, because it can be done with only a change in the shape of the broaching cutter for a conventional joint. It is easy to form the track groove 16, especially when at least the portion between the location Z exceeding the contact point Y and the shoulder portion X of the track groove 16 is formed by a forging surface. In other words, when forming the track groove 16 by cold forging, it is easy to form the composite Gothic arch shape composed of the Gothic arch portion 20 and the straight-line portion 21 or the curve portion 22, by molding the shape of the die to be a composite Gothic arch shape, beforehand. It is also possible to form the track groove 16 by cold forging beforehand, and to form just the Gothic arch portion 20 by a process of grinding, afterwards. When chamfering $X_c$ (see FIG. 1A) is formed on the shoulder portion X of the track groove 16, the deformation a (see FIG. 6a) or burr b (see FIG. 6b) caused by a dent can be restrained even more positively, because the clearance δ between the shoulder portion X of the track groove 16 and the ball 3 can be made even bigger.

The undercut portion is not limited to the aforementioned straight-line portion 21 or curve portion 22, and it can be of any form, so long as the surface of the track groove at the undercut portion is formed so that the clearance with the ball 3 is bigger than in the case of a virtual groove surface, when this virtual groove surface is a groove surface formed virtually by the radius of curvature R of the Gothic arch portion 20. In the aforementioned two embodiments, description was made with regard to the track groove 16 of the inner ring 1. This is because there is more possibility of a deformation and a burr being generated in the track groove 16 of the inner ring 1, in comparison to the track groove of the outer ring 2. Therefore, the shape of the track groove of the outer ring 2 can also be made a composite Gothic arch shape, composed of the aforementioned Gothic arch portion 20, and the aforementioned straight-line portion 21 or curve portion 22.

What is claimed is:

1. A constant velocity universal joint having track grooves formed on both an outer circumference surface of an inner ring, and on an inner circumference surface of an outer ring, and extending in an axial direction, and accommodating balls embedded between both of the track grooves in pockets of a cage interposed between the outer circumference of the inner ring and the inner circumference surface of the outer ring, wherein a cross-section shape of at least the track groove of the inner ring among said track grooves of the inner and outer rings is constituted by a Gothic arch portion that angular contacts with the ball, and an undercut portion formed between a location exceeding a contact point of the Gothic arch portion and the ball and a shoulder portion formed at opposing circumferential ends of the track groove, and retreating from a surface of the radius of curvature of the Gothic arch portion, wherein a chamfer is formed at the shoulder portion of said track groove.

2. The constant velocity universal joint according to claim 1, wherein said undercut portion is a straight-line portion formed continuously with the Gothic arch portion at the location exceeding the contact point.

3. The constant velocity universal joint according to claim 1, wherein said undercut portion is a curve portion formed continuously with the Gothic arch portion at the location exceeding the contact point, and having a radius of curvature bigger than the radius of curvature of the Gothic arch portion.

4. The constant velocity universal joint according to any one of claims 2, 3 and 1, wherein said constant velocity universal joint is one selected from the group consisting of a Lobro-type constant velocity universal joint (LJ), a Rzepper-type constant velocity universal joint (BJ), and a double offset type constant velocity universal joint (DOJ).

5. The constant velocity universal joint according to any one of claims 2, 3 and 1, wherein at least a portion between said location exceeding the contact point and the shoulder portion of the track groove is formed by a forging surface in said track groove.

6. The constant velocity universal joint according to claim 5, wherein said constant velocity universal joint is one selected from the group consisting of a Lobro-type constant velocity universal joint (LJ), a Rzepper-type constant velocity universal joint (BJ), and a double offset type constant velocity universal joint (DOJ).

* * * * *